Jan. 29, 1957 M. E. DISSER Re. 24,269
POWER-OPERATED IMPACT TOOL
Original Filed July 20, 1950
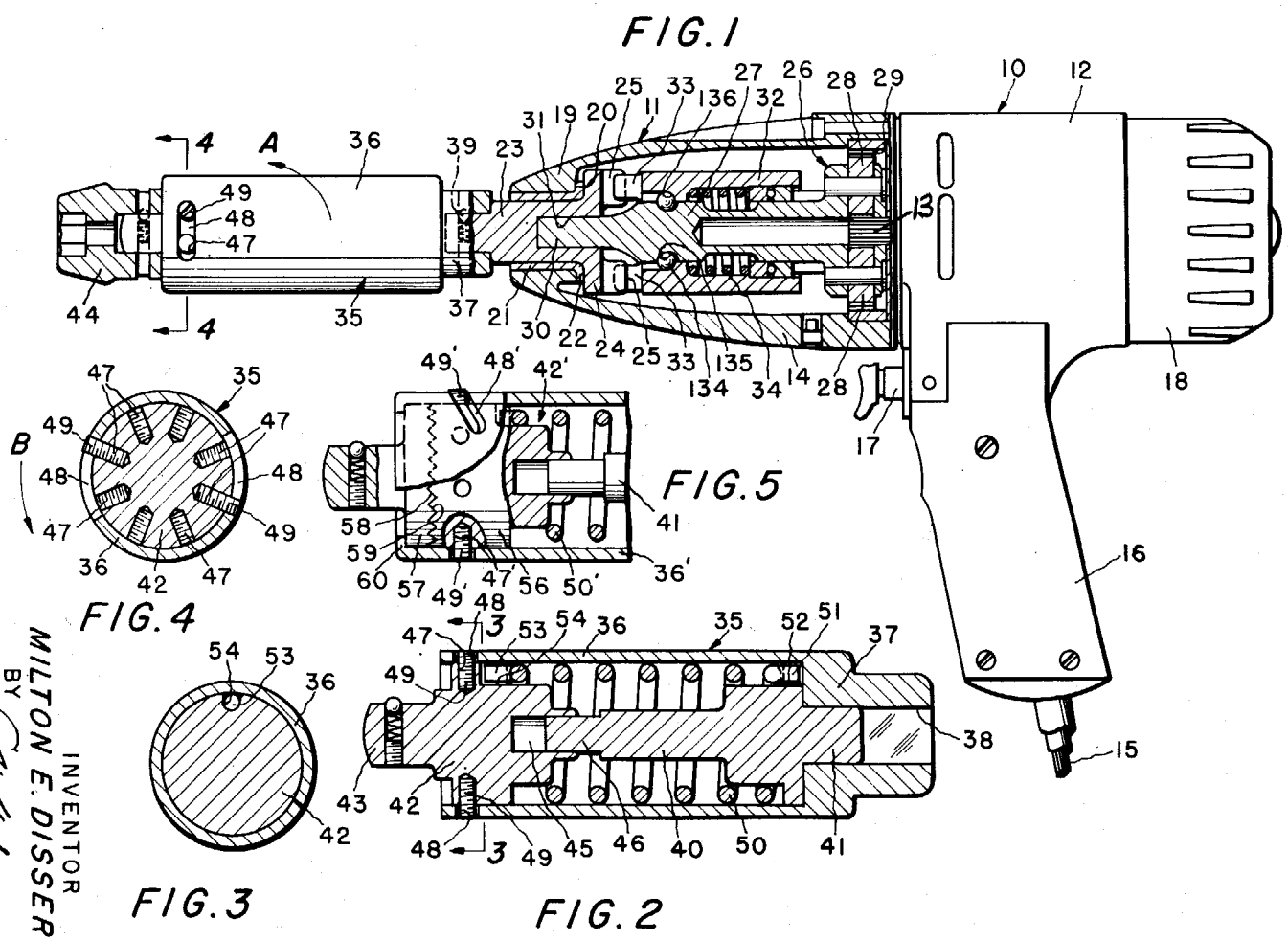
INVENTOR
MILTON E. DISSER
BY
HIS ATTORNEY United States Patent Office Re. 24,269
Reissued Jan. 29, 1957

24,269

POWER-OPERATED IMPACT TOOL

Milton E. Disser, Lexington, Mich., assignor to Ingersoll-Rand Company, New York, N. Y.

Original No. 2,608,118, dated August 26, 1952, Serial No. 174,997, July 20, 1950. Application for reissue February 17, 1956, Serial No. 566,325

25 Claims. (Cl. 81—52.3)

Matter enclosed in heavy brackets [ ] appears in the original patent but forms no part of this reissue specification; matter printed in italics indicates the additions made by reissue.

This invention relates generally to power operated impact tools, and refers more particularly to power driven rotary impact wrenches of the type adapted to deliver a rapid succession of rotary impulses.

Tools of the above general type are used extensively for the purpose of setting nuts, bolts, and the like. The setting operation is accomplished by the rapid succession of impacts imparted to the part being set, and the torque applied is limited only by the rated power of the tool driving means.

It is an object of this invention to improve power impact tools of the type briefly noted above by providing means for [cancelling-out] *limiting, or reducing,* the effect of the power impulses when the load on the part being set exceeds a selected value below the rated torque characteristics of the tool. In accordance with this invention the power impulses are applied to the nut, bolt, or other part to be set through resilient means such as a spring held under torsional stress and adapted to *accumulate a portion of the energy of* [absorb] the power impulses when the resistance to further tightening or setting of the part exceeds the *said torsional stress of* [forces applied by] the spring.

It is another feature of this invention to provide a device attachable to the driving head of rotary power operated impact tools without altering the construction of the latter and embodying means for [cancelling-out] *limiting* the effect of the power impulses when the load on the driven member of the device exceeds a predetermined amount.

It is a further object of this invention to provide torque control means of the above general type capable of being readily applied to existing impact tools of various different designs and regardless of the mechanisms employed in the tools to produce the power impulses.

The foregoing as well as other objects will be made more apparent as this description proceeds, especially when considered in connection with the accompanying drawing wherein:

Figure 1 is a side elevational view partly in section, of a power operated impact tool having torque control means forming the subject matter of this invention;

Figure 2 is a longitudinal sectional view through the torque control means;

Figure 3 is a cross sectional view taken on the line 3—3 of Figure 2;

Figure 4 is a cross sectional view taken on the line 4—4 of Figure 1; and

Figure 5 is a fragmentary sectional view of a modified construction.

A typical tool embodying the features of this invention is shown in Figure 1 of the drawing and is indicated generally by the reference character 10. The tool 10 has a housing 11 composed of sections removably secured together for ease in assembly and manufacture. The rear end section 12 provides a case for the usual prime mover which, in the present instance, is an electric motor (not shown) having a drive shaft 13 extending in a forward direction into the rear end of the front housing section 14. Electrical energy is supplied to the motor by conductors 15 which extend through the handle portion 16. The handle portion 16 is of the pistol-grip type and is preferably formed integral with the end housing section 12. A suitable trigger operated off and on switch 17 is embodied in the handle, and is electrically connected in the motor circuit to control the operation of the motor. The location of the switch 17 in relation to the handle 16 is such as to enable convenient manipulation of the switch by the hand of the operator engaged with the handle. The rear end of the housing section 12 is closed by a cap 18 supported for rotation and connected to the electric motor in a manner known in the art to change the polarity of the motor and reverse the direction of rotation of the latter.

The front end of the housing section 14 terminates in a nose portion 19 axially bored to form an opening through the front end of the housing and having a radially outwardly extending shoulder 20 within the housing. A bearing sleeve 21 is secured to the nose portion 19 within the opening and terminates at the rear end in a radially outwardly extending part 22. The part 22 seats against the shoulder 20 and provides an end thrust bearing.

Journaled in the sleeve 21 is an anvil 23 having a radially outwardly extending flange 24 at the rear end engageable with the thrust bearing part 22 on the sleeve 21 and having diametrically opposed lugs 25 extending axially from the flange 24 in a rearward direction. The front end of the anvil extends forwardly through the opening in the nose 19 of the housing and is polygonally shaped in cross section for a purpose to be presently described.

[The anvil 23 is operatively connected to the] *The* motor drive shaft 13 *is connected to rotate* [by] a planetary gear assembly 26 having a frame 27 and having planet gears 28 suitably journaled on the rear end of the frame. The planet gears 28 mesh with teeth formed on the motor drive shaft 13 and also mesh with an internal ring gear 29 secured to the housing section 14 at the rear end of the latter. The front end of the frame 27 is formed with a pilot 30 which is journaled in a bore 31 formed in the anvil 23 and opening through the rear end of the anvil. A sleeve 32 is [non-]rotatably supported on the frame 27 at the rear side of the anvil 23 *by balls 134 positioned in cam grooves 135 in the frame 27 and extending into cam grooves 136 in the inner periphery of the sleeve 32. (This cam construction is shown and fully described in U. S. Patent No. 2,160,150.) The sleeve 32* [and] is formed with circumferentially spaced driving lugs 33 *which* [at the front end. The lugs 33] extend axially forwardly from the sleeve 32 and are positioned in the path of travel of the lugs 25 on the anvil. The sleeve 32 slides in opposite directions relative to the frame and is normally urged by a coil spring 34 in a forward direction to locate the lugs 33 in the path of the lugs 25. The spring 34 surrounds the frame within the sleeve 32 and the opposite ends of the spring 34 respectively engage axially spaced shoulders on the sleeve 32.

The above construction is such that the sleeve 32 is driven by the motor shaft 13 through the planetary gearing 26 *and cam connections 134, 135 and 136,* and the anvil 23 is driven by the sleeve through the lugs 25 and 33. The anvil 23 rotates continuously until a *predetermined* load is applied to the anvil whereupon the lugs 33 react against the lugs 25 and the sleeve 32 [retracts or moves] *is cammed rearwardly* against the action of the spring 34 to withdraw the lugs 33 from the path of the lugs 25. As soon as the lugs 33 on the sleeve are withdrawn from the path of the lugs 25 on the anvil, the spring 34 acts to return the sleeve 32 to its forward position wherein the lugs 33 again assume positions in the path of the lugs 25. Since the sleeve 32 is being rotated by the planetary gearing 26 the lugs 33 on the sleeve strike the lugs 25 on the anvil with a blow of substantial force and impart a rotative movement to the anvil. This cycle of operation is repeated periodically so that a succession of power impulses are applied to the anvil for rotating the same. Assuming that the anvil is operatively connected to a nut or bolt, it follows that the latter will eventually be securely set with practically no effort on the part of the operator.

Of course the foot pounds of torque applied by the anvil are limited only by the rating of the tool and in order to control this torque, provision is made for *accumulating a portion of the energy of* [absorbing] the power impulses when the load on the part being set exceeds a predetermined value. This is accomplished herein by a device 35 having a sleeve 36 formed with an enlargement 37 at the rear end and having a bore 38 extending axially through the enlargement. The bore 38 corresponds in cross sectional contour to the front end of the anvil 23 and slidably receives the latter. A suitable spring operated detent 39 is provided on the front end of the anvil in a position to frictionally engage the adjacent side of the bore 38 to removably retain the sleeve 36 in assembled relation to the anvil.

Supported within the sleeve 36 is a driving member 40 having a polygonally shaped part 41 at the rear end removably sleeved within the adjacent end of the bore 38 to lie in juxtaposition to the front end of the anvil 23. Thus the sleeve 36 provides a removable coupling between the anvil 23 and the driving member 40. The front end of the sleeve 36 is closed by a driven member 42 telescoped within the sleeve 36 and having a part 43 projecting axially forwardly beyond the front end of the sleeve 36. The part 43 is polygonally shaped in cross section and provides a mounting for a socket 44 which in the present instance is designed to fit a certain size nut or bolt head. The rear end of the member 42 has an axially extending round bore 45 for telescopically receiving a cylindrical projection 46 at the front end of the member 40.

As shown in Figure 4 of the drawing the member 42 is formed with a plurality of circumferentially spaced radially extending tapped holes 47 and the adjacent wall of the sleeve 36 has diametrically opposed circumferentially extending slots 48 registrable with the holes 47. Suitable machine screws 49 are threaded in diametrically opposed holes 47 and the heads of the screws respectively project into the slots 48. Thus the driven member 42 has limited rotative movement relative to the sleeve 36 and driving member 40.

The driving and driven members are operatively connected by resilient means in the form of a coil spring 50 disposed within the sleeve 36 and held under torsion between the driving and driven members. The rear end 51 of the spring extends rearwardly into a slot 52 formed in the driving member 40 and the front end 53 of the spring extends forwardly into a slot 54 formed in the driven member 42.

The above arrangement is such that rotative power impacts applied to the anvil 23 rotate the driving member 40 together with the sleeve 36 in the direction of the arrow A in Figure 1 of the drawing. As shown in Figure 1 the screws 49 are maintained in engagement with the leading ends of the slots 48 by the action of the spring 50 so that rotation of the driving member 40 in the direction of the arrow A is transmitted by the spring 50 to the driven member 42. When the load on the driven member 42, or in other words, when the resistance to rotation of the driven member exceeds the prestressed torsional force of the spring 50, subsequent power impulses applied to the anvil 23 merely act to wind up *further* the spring 50 and are [absorbed] *in part accumulated* by the latter spring. When such a condition exists, the reaction of the coil spring 50 following each power impulse rotates the anvil 23 *and sleeve 32* in the reverse direction [to advance the lugs 25 on the anvil toward the lugs 33 on the sleeve 32] and thereby cancels out to a great extent the force of the impacts.

With a spring 50 of given size, the foot pounds of torque applied by the driven member 42 on the part to be set depend upon the *prestressed* torsional force [exerted by] *of* the spring 50 and provision is made herein for varying the torque characteristic by altering the degree of spring torsion. This is accomplished by rotating the member 42 in the direction of the arrow B in Figure 4 of the drawing prior to installing the screws 49. When the spring 50 is wound to the selected extent by the above procedure, the screws are installed in the holes 47 registering with the leading ends of the slots 48 so that the screw heads abut the latter ends of the slots and hold the spring 50 in the selected adjusted position. The purpose of the slots 48 is, of course, to permit the necessary angular movement of the sleeve 36 relative to the driven member when the load on the latter exceeds the *prestressed* torsional force [exerted by] *of* the spring 50.

As stated above the tapped holes 47 are spaced from each other circumferentially of the member 42, and the angular distance between the holes 47 may be determined so that this distance represents a definite torque characteristic. In other words by predetermining the angular relationship between adjacent holes 47, the amount of torsion on the spring 50 to produce a predetermined torque output may be mathematically determined. In other words winding the spring 50 from its free position throughout preselected degrees of angular movement provides predetermined torque characteristics in inch or foot pounds. It follows, therefore, that the output of the tool in inch or foot pounds or torque may be determined with reasonable accuracy by the extent the spring 50 is wound during rotative adjustment of the member 42.

It will be noted from the above that the device 35 may form a part of the tool assembly or it may be used as an attachment for power driven impact tools of various different constructions. In any case the device renders it possible to control within reasonably close limits the foot pounds of torque applied to a part such, for example, as a nut, bolt or the like to set the same. Thus the proper degree of setting is secured in the minimum length of time without the danger of breakage.

In the embodiment of the invention shown in Figure 5 of the drawing, the driven member 42′ is actually formed of two parts 56 and 57. The adjacent sides of the two parts are provided with intermeshing teeth 58 and 59 respectively. The teeth are normally maintained in intermeshing relationship by a torsional spring 50′ which corresponds to the spring 50 in the first described form of the invention. The driven member 42′ is rotatably supported in a sleeve 36′ identical to the sleeve 36 previously described, with the exception that the front end is provided with a stop 60 arranged to engage the front side of the part 57 and maintain the latter in assembled relationship with the sleeve.

The part 56 has circumferentially spaced tapped holes 47′ corresponding to the holes 47 in the driven member 42, and screws 49′ are selectively engaged in the holes in the same manner described in connection with the first form of this invention. The heads of the screws 49′ respectively engage in slots 48′ formed in the sleeve 36′. The slots 48′ differ from the slots 48 in the first described form of the invention in that they are inclined rearwardly with respect to the front end of the sleeve 36′.

The construction shown in Figure 5 operates in the same manner as the tool shown in Figures 1 to 4 inclusive with the exception that when the load applied to the part 57 exceeds the force exerted by the spring 50', successive power impacts applied to the driving member 41 merely serve to wind the spring 50'; and in so doing, rotate the part 56 in a direction to cause the screws 49' to travel along the slots 48'. Owing to the fact that the slots are inclined in the direction noted in Figure 5 of the drawings, the part 56 is withdrawn from the part 57 sufficiently to disengage the teeth. In other respects the operation of the two embodiments is the same and corresponding parts are indicated by the same reference numerals.

What I claim as my invention is:

1. In a tool of the class described, a driving member and a driven member, means for imparting a succession of power impulses to the driving member, and [means] *a prestressed spring* interposed between said members for transmitting the power impulses from the driving member to the driven member *and constituting the sole driving connection between said members,* said means being operative to *limit* [cancel out] the effect of the power impulses on the driven member when the load on the driven member exceeds a predetermined value.

2. In a tool of the class described, a driving member supported for rotation, a driven member supported for rotation relative to the driving member, means for imparting a succession of rotative impacts to the driving member for rotating the same, and means interposed between said members for transmitting the impacts from the driving member to the driven member, said means being operative to *transfer substantially all the energy of such impacts below a predetermined turning force of the driving member and to accumulate substantially all such energy above said value* [cancel out the effect of the impacts on the driven member when the load on the driven member exceeds a predetermined value].

3. The tool set forth in claim 2 in which the *second said* means [for cancelling-out the impacts] comprises a coil spring held under torsion between said members and having the opposite ends respectively connected to the members.

4. The tool set forth in claim 3 in which means is provided for selectively varying the degree of [tension] *torsion* of the coil spring.

5. In a tool of the class described, a driving member supported for rotation, a driven member supported for rotation relative to the driving member, means for imparting a succession of rotative impacts to the driving member for rotating the same, and resilient means having portions respectively connected to said driving member and driven member, said resilient means providing a sole driving connection between the members and adapted to [absorb] *accumulate a portion of the energy of* the impact forces when the load on the driven member exceeds a predetermined desired value.

6. The tool set forth in claim 5 in which the resilient means comprises a coil spring held under torsion between the members, and means for varying the degree of torsion of the coil spring.

7. In a tool of the class described, a driving member supported for rotation, a driven member supported for rotation relative to the driving member, said members being in axial alignment and having portions telescopically engaging one another, means for imparting a succession of rotative power impacts to the driving member for rotating the latter, and a coil spring surrounding the telescopically engaging portions of the members and having the opposite ends respectively secured to the members, said coil spring being held under torsion between the members and constituting the sole driving connection between the members.

8. The tool set forth in claim 7 having means for [rotating] *angularly adjusting* the driven member relative to the driving member for varying the degree of torsion of the coil spring.

9. In a tool of the class described, a part supported for rotation, means for imparting a succession of impacts to said part for rotating the latter, a driving member removably coupled to said part for rotation by the latter, a driven member removably coupled to the driving member and supported for rotation relative to the driving member, and a driving connection between said members responsive to loads on the driven member in excess of a predetermined value to *limit* [cancel-out] the effect of the impacts on the driven member.

10. The tool set forth in claim 9 in which the driving connection comprises a coil spring held under torsion between said members.

11. In a tool of the class described, a part supported for rotation, means for imparting a succession of power impacts to said part for rotating the latter, a sleeve removably attachable at one end to the part and rotatable as a unit with said part, a driving member housed within the sleeve and having a removable driving connection with the end aforesaid of the sleeve, a driven member removably supported within the opposite end of the sleeve and having limited rotative movement relative to the sleeve, and a spring housed within the sleeve under torsion between the members and having the opposite ends respectively connected to said members.

12. The tool set forth in claim 11 having means for [rotatably] *angularly* adjusting the driven member relative to the sleeve for varying the degree of torsion of the spring.

13. An attachment for power-driven impact tools having a driving head and having means for imparting a succession of power impacts to the head for rotating the latter, said attachment comprising a sleeve having means at one end to provide a removable driving connection with the head, a driving member housed within the sleeve and having a removable driving connection with said end of the sleeve, a driven member supported within the opposite end of the sleeve and connected to the sleeve for limited rotative movement relative to the sleeve, and resilient means also housed within the sleeve and providing a driving connection between said members.

14. The attachment set forth in claim 13 in which the resilient means comprises a coil spring held under torsion between said members and having the opposite ends respectively removably secured to said members.

15. The attachment set forth in claim 14 in which the driven member is angularly adjustable relative to the sleeve to vary the degree of torsion of the spring.

16. In a tool of the class described, a driving member supported for rotation, a driven member supported for rotation relative to the driving member, means for imparting a succession of rotative impacts to the driving member for rotating the same, resilient means providing the sole driving connection between the members and adapted to *accumulate a portion of the energy of the impacts* [absorb the impact forces] when the load on the driven member exceeds a predetermined desired value, said resilient means comprising a [coil] spring secured at opposite ends to the respective members and held under torsion, and means for adjustably [rotating] *adjusting* one of the members relative to the other throughout predetermined angular increments of travel to vary the torsional force exerted by the spring.

17. In a tool of the class described, a driving member supported for rotation, means for imparting a succession of rotative impacts to the driving member for rotating the same, a driven member supported for rotation relative to the driving member, said driven member having a first part to which the load is applied and having a second part rotatable relative to the first part, cooperating intermeshing teeth on adjacent sides of said parts, resilient means for urging the teeth on said parts in intermeshing relationship and comprising a coil spring secured at one end to the driving member and secured at the opposite end to the second part, said spring being held under torsion and constituting the sole driving connection between the driving member and second part, and means for moving the second part in a direction away from the first part to disengage the intermeshing teeth when the load on the first part exceeds the force applied to the second part by the spring.

18. In a tool of the class described, a driving member supported for rotation, means for imparting a succession of rotative impacts to the driving member for rotating the same, a driven member supported for rotation relative to the driving member, said driven member having a first part to which the load is applied and having a second part rotatable relative to the first part, cooperating intermeshing teeth on adjacent sides of said parts, and resilient means for urging the teeth on said parts in intermeshing relationship and comprising a coil spring secured at one end to the driving member and secured at the opposite end to the second part, said spring being held under torsion and constituting the sole driving connection between the driving member and second part.

19. In a tool of the class described, a driving *member supported for rotation, a driven* member supported for rotation relative to said driving member, means for imparting a succession of rotative impacts to said driving member for rotating the same, and resilient means held under a predetermined [tension] *stress* and having portions respectively connected to said driving member and driven member, said resilient means providing the sole driving connection between said members and adapted to *limit the magnitude of* [absorb] the impact forces *transmitted thereby only* when the load on said driven member exceeds said predetermined value.

20. In a tool of the class described, a driving member supported for rotation, a driven member supported for rotation relative to the driving member, means for imparting a succession of rotative power impacts to the driving member for rotating the latter, and a coil spring surrounding the members and having the opposite ends respectively secured to the members, said coil spring being held under torsion between the members and constituting the sole driving connection between the members.

*21. In a tool of the class described, a driving member and a driven member, spring means connected between said members for transmitting movement of the driving member to the driven member, and means for prestressing said spring means such that it serves as a substantially rigid connection between said members so long as the force moving the driven member is below a predetermined value and as an elastic connection whenever such force exceeds said value.*

*22. A tool of the class described, a driving member,*

*a driven member supported for rotation relative to the driving member, means for imparting a succession of rotational impacts to the driving member, a spring connected between said members for transmitting rotary motion therebetween, and means for prestressing the spring to substantially prevent rotation of the driving member relative to the driven member so long as the resistance to rotation of the driven member is below a predetermined value and to permit the driving member to be rotated relative to the driven member and to increase the spring stress whenever such resistance exceeds said value.*

*23. In a tool of the class described, a driving member, a driven member supported for rotation relative to the driving member, means for positively limiting such relative rotation in one direction, spring means connected between said members for transmitting rotation of the driving member to the driven member and constituting the sole driving connection therebetween, said spring means being prestressed to constantly urge said members to rotate relative to each other in said direction.*

*24. The tool set forth in claim 23 in which the first said means is operative only to limit relative rotation in which the driven member tends to rotate in the direction of rotation of the driving member.*

*25. A device of the character described having a resilient connecting element adapted to transmit rotative impact impulses from a driving member to a driven member and constituting the sole driving connection therebetween, and means to maintain stressed the connecting element in a direction opposite to said impact impulses.*

References Cited in the file of this patent or the original patent

UNITED STATES PATENTS

| | | |
|---|---|---|
| 2,012,916 | Pott | Aug. 27, 1935 |
| 2,100,552 | Ripsch et al. | Nov. 30, 1937 |
| 2,111,280 | Connell | Mar. 15, 1938 |
| 2,184,394 | Moretti | Dec. 26, 1939 |
| 2,256,496 | Robinson | Sept. 23, 1941 |
| 2,378,956 | Thorner | June 26, 1945 |
| 2,450,185 | Craven | Sept. 28, 1948 |
| 2,492,840 | Bugg | Dec. 27, 1949 |
| 2,533,703 | Wilhide et al. | Dec. 12, 1950 |
| 2,544,736 | Szekely | Mar. 13, 1951 |
| 2,576,851 | Newman | Nov. 27, 1951 |

FOREIGN PATENTS

| | | |
|---|---|---|
| 687,129 | Great Britain | Feb. 4, 1953 |